July 27, 1948.  B. LITMAN  2,445,788
ROTARY AMPLIFIER
Filed July 20, 1946
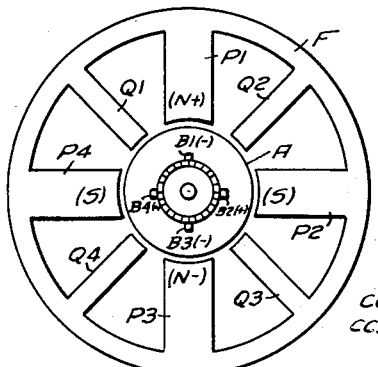
Fig.1.
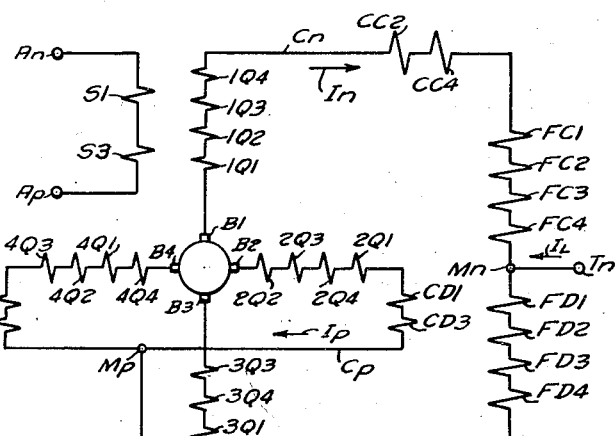
Fig.2.
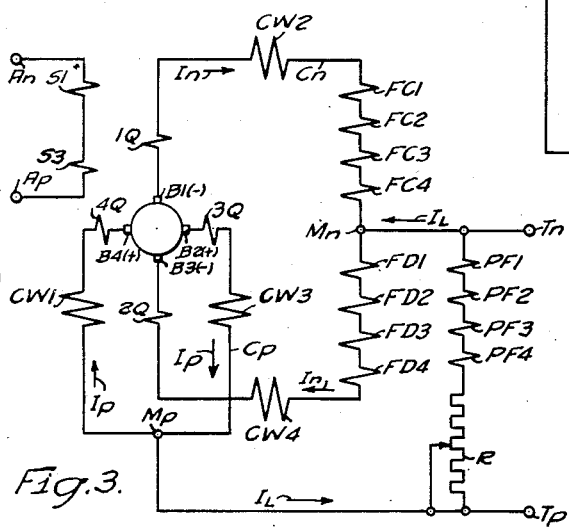
Fig.3.
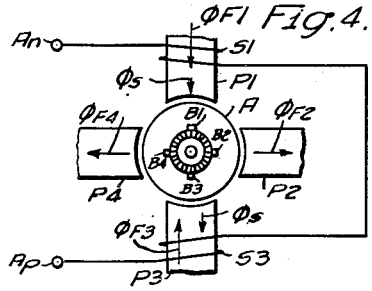
Fig.4.
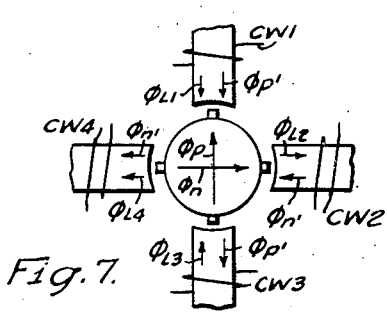
Fig.7.
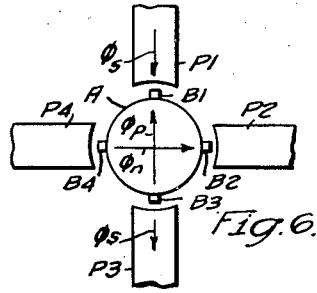
Fig.6.
Fig.5.
WITNESSES:
E.A.M'Closkey.
C. W. Avery
INVENTOR
Bernard Litman.
BY
Paul E. Friedman
ATTORNEY Patented July 27, 1948

2,445,788

UNITED STATES PATENT OFFICE 2,445,788

ROTARY AMPLIFIER

Bernard Litman, Wilkinsburg, Pa., assignor to Westinghouse Electric Corporation, East Pittsburgh, Pa., a corporation of Pennsylvania Application July 20, 1946, Serial No. 685,109

5 Claims. (Cl. 322—92)

My invention relates to rotary direct-current generators of the amplifying multi-pole type disclosed in the copending applications Serial No. 607,440, filed July 27, 1945 and Serial No. 682,188, filed July 9, 1946.

Machines of this kind are equipped with signal excited field windings so as to produce a controlled distortion of the flux distribution in the multi-pole field structure of the machine and thereby cause an equalizing circulating current to flow between interconnected equipolar commutator brushes; and this internal circulating current is utilized for controlling, in one or several internal amplifying stages, the multi-pole main field excitation of the machine. In this manner, a plural stage amplification of low time constant and high amplification ratio can be obtained within a single machine structure.

Such machines develop an armature reaction flux in opposition to the signal or input excited control flux, and it is necessary to reduce this reaction flux or diminish its effect in order to prevent it excessively affecting the signal flux. To this end, a number of auxiliary field coils are connected in the above-mentioned circuits or brush connections that carry the internal circulating currents of the machine, and these auxiliary coils are so arranged that they reduce or counteract the detrimental reaction flux.

According to the above-mentioned patents, the auxiliary compensating or opposition coils are arranged on the field poles in pairs so that each pole carrying one of the auxiliary coils has always a second, equally dimensioned, auxiliary coil so connected with the first coil that both are serially traversed by the same internal circulating current and act cumulatively relative to that current, while they are parallel connected and of mutually differential action with respect to the load current of the machine. As a result, the load current has no resultant effect on the pole carrying these two auxiliary coils, and the desired compensating flux is controlled only by the internal circulating current.

In addition to the signal excitation coils, main excitation coils and compensating coils mentioned above, amplifying machines of the type here in point require for certain applications the provision of self-excitation. According to the above-mentioned patents, and as is customary with generators in general, such self-excitation is obtained by means of series, shunt or compound-connected coils which are placed on the main field poles of the machine and energized by the output or load current or voltage.

It will be understood from the foregoing that, aside from the customary commutation coils located on the interpoles, each of the main field poles of the machine is required to carry a larger number of coils than in generators or exciters of conventional types. The correspondingly larger amount of copper conductors, insulation and total coil space render it difficult to maintain for the double or multiple stage machines the same overall dimensions as for conventional exciters of the same output capacity so that it was necessary to design these amplifiers either with larger dimensions or for a somewhat reduced output wattage as compared with single stage exciters.

It is, therefore, an object of my invention to devise plural-stage amplifying machines which, while maintaining the operating characteristics and advantages of the rotary machines according to the above-mentioned patents, permit a reduction in the amount of copper and coil space required for the main poles and thus afford giving these machines smaller dimensions or increased capacity.

To this end, the invention concerns particularly the design and electric connection of the main-pole field coils that serve to provide the above-mentioned auxiliary fluxes for opposing or compensating the detrimental armature reaction flux, and is also related to the manner of providing the machine with self-excitation. More especially, the invention, in its basic aspect, involves a novel design and arrangement of the auxiliary compensating or opposition coils which results in a reduction in the number and total space requirements of these auxiliary coils and has likewise the effect of providing part or all of the self-excitation of the machine, thus reducing also the coil space previously needed for self-excitation.

How these improvements are achieved will best be understood from the description of an embodiment of the invention. Hence, before explaining further details of my invention, reference will be had to the drawing, in which:

Figure 1 shows schematically the magnetic stator and armature structure of a double-stage amplifier according to the invention, Fig. 2 is presented for explanatory purposes and shows one of the applicable circuit diagrams of such a machine, this diagram being designed in accordance with the disclosure of the above first-mentioned patent application and not representative of the present invention, while Fig. 3, in contrast to Fig. 2, illustrates the circuit diagram of a machine which, by virtue of the invention, operates basically in the same manner as the machine according to Fig. 2 though containing less than half the number of auxiliary and self-exciting coil units, and Figs. 4, 5, 6 and 7 are explanatory diagrams which relate to machines according to my invention as represented by Figs. 1 and 3 and serve to elucidate different component flux conditions prevailing in the field poles and armature of the machine.

The magnetic field and armature structure of a machine according to the invention is not different from the corresponding parts of the machines described in the last-mentioned patent and, in fact, similar in design to the field and armature structures of conventional direct-current generators. The field structure F illustrated in Fig. 1 has four main poles P1, P2, P3, P4 and four interpoles Q1, Q2, Q3, Q4. A lap-wound armature and the appertaining commutator are schematically represented at A, and the four commutator brushes are denoted by B1, B2, B3, B4. The armature conductors (not shown) are assumed to have normal chording as customary in conventional four pole machines. During the operation of the machine, with the armature running counterclockwise and the four main poles properly excited, poles P1 and P3 are assumed to have north polarity, while poles P2 and P4 are south poles. Brushes B1 and B3 have then a negative potential and brushes B2 and B4 a positive potential.

It will be remembered that in conventional generators the excitations of the four main poles, under proper operating conditions are of equal magnitude so that the flux distribution is symmetrical, with the result of producing equal positive potentials at brushes B2 and B4, and equal negative potentials at brushes B1 and B3. Hence no current will circulate in the equalizing connections conventionally connected between brushes B2 and B4, and between B1 and B3. It should be understood, however, that these conditions do not obtain in machines according to the invention due to the fact that the excitation and internal connections are different from conventional machines as will be explained presently.

As apparent from Figs. 2 and 3, which show identical details as regards the excitation coils and circuits discussed in this paragraph, eight main field coils (forcing coils), denoted by FC1, FC2, FC3, FC4 and FD1, FD2, FD3, FD4 are provided. These coils have equal numbers of turns. Coils FC1 and FD1 are mounted on pole P1 (see Fig. 1). Coils FC2 and FD2 are mounted on pole P2. Coils FC3 and FD3 are mounted on pole P3, and coils FC4 and FD4 on pole P4. All eight forcing coils are series connected in circuit $Cn$ between brushes B1 and B3 and excited by internal circulating current ($In$) as will be further explained in a later place. When excited, the forcing coils induce in the four poles a component flux of symmetrical distribution so as to impart to poles P1 and P3 north polarity of equal strength while making poles P2 and P4 south poles and also of equal strength. As regards this component flux, therefore, the field excitation of the machine is comparable to ordinary four-pole generators. However, the two north poles P1 and P3, and these two poles only, are also equipped with control or signal coils S1 and S3 respectively. These control coils are connected to input terminals $Ap$ and $An$ from which they are excited by the signal voltage to be amplified. Coils S1 and S3 are separately shown in Fig. 4.

They act differently relative to the main fluxes induced by the forcing coils in poles P1 and P3. That is, the signal flux $\phi s$ is cumulative with respect to the main flux component $\phi_{F1}$ in pole P1 but differential with respect to the main flux component $\phi_{F3}$ in pole P3. Consequently, when a signal voltage is applied across the input terminals $Ap$ and $An$, the resulting control flux $\phi s$ increases the strength of north pole P1 and reduces the strength of north pole P3. Therefore, the distribution of the resultant flux is no longer symmetrical so that the electric potentials of the negative brushes B1 and B3 are not equal. The potential difference, controlled by the control flux, drives the above-mentioned circulating or equalizing current $In$ (Figs. 2 and 3) through the circuit $Cn$ and the forcing coils FC1—FC4 and FD1—FD4.

The load or output circuit of the machine extends between the terminals $Tn$ and $Tp$ (Figs. 2 and 3). Terminal $Tn$ is attached to the midpoint $Mn$ of the internal circuit $Cn$. Terminal $Tp$ is similarly attached to a point $Mp$ of a cross connection $Cp$ between the equipolar (positive) brushes B2 and B4. The load current $IL$ flows from terminal $Tn$ to point $Mn$ and thence in two parallel branches through forcing coils FC4—FC1 to brush B1 and through forcing coils FD1—FD4 to brush B3. The excitation of coil FC1 by the load current $IL$ is balanced and cancelled by the load current excitation of coil FD1. Similarly, the coils of each pair FC2 and FD2, FC3 and FD3, FC4 and FD4 act differentially as regards the load current $IL$. Consequently, the load or output current of the machine has no effect on the field excitation, this excitation being determined only by the internal circulating current $In$ under control by the control excitation of coils S1 and S3.

The field circuits described so far can be analyzed to operate as two cascade connected amplifying stages. The first stage is schematically represented by Fig. 4. Its input circuit extends between input terminals $An$ and $Ap$ and includes the control coils S1 and S3. The amplified output voltage of the first stage appears between brushes B1 and B3. The input circuit of the second stage is separately and schematically shown in Fig. 5. It extends between brushes B1 and B3 and includes the eight forcing coils, thus exciting all four poles as explained previously. The further amplified output voltage of the second stage appears across the positive brushes B2, B4 on the one hand, and the negative brushes B1, B3 on the other hand, so that the output circuit of the second stage includes all four brushes as also set forth above. The magnetic field and armature structures (Fig. 1) are dimensioned to operate within the unsaturated range of their magnetic characteristic. Under this condition, the two amplifying stages and the respective magnetic fluxes are superimposed without affecting each other. Hence, the machine operates like two separate and cascade-connected single-stage amplifiers but, due to the presence of a single magnetic system, occupies the space and develops a time constant of only one machine; and this is the reason for the high sensitivity and high speed of response achieved with this type of amplifier.

In order to assist commutation, the interpoles Q1, Q2, Q3, Q4 (see Fig. 1) of the above-described amplifier are equipped with commutation coils connected in the internal machine circuits, for instance, as shown in Fig. 2. Commutation coils 1Q1, 2Q1, 3Q1, 2Q2, 3Q2, 4Q2 are disposed on interpole Q2; coils 1Q3, 2Q3, 3Q3, 4Q4 on interpole Q3; and coils 1Q4, 2Q4, 3Q4, 4Q4 on interpole Q4. These coils may be designed or rated as explained more in detail in the above-mentioned patent applications. However, it is also possible to use only three commutation coils on each interpole as described in the copending application Serial No. 696,575, filed Sept. 12, 1946. As a matter of fact, the particular design and connection of the commutation coils is not a feature of the present invention proper. Hence, in Fig. 3, these commutation coils are merely symbolically represented by some suitable coils 1Q, 2Q, 3Q, 4Q associated with the respective interpoles Q1, Q2, Q3 and Q4 and will not be further discussed in this specification.

The machine circuits shown in Figs. 2 and 3 are further equipped for self-excitation and provided with auxiliary coils for compensating detrimental armature reaction flux. As regards these features, however, the system of Fig. 3 is essentially different from that shown in Fig. 2 and incorporates basic features of the invention proper.

According to the system of Fig. 2, eight auxiliary coil units are provided of which the units CC2 and CD2 are mounted on pole P2 to be cumulatively excited by the circulating current $In$. Coils CC4 and CD4, on pole P4, are likewise cumulatively excited by current $In$. Coil units CC1 and CD1, disposed on pole P1, are cumulatively excited by circulating current $Ip$; and coil units CC3 and CD3 act cumulatively on pole P3 also under excitation by current $Ip$. Each pair of coil units CC1, CD1 or CC2, CD2, etc., acts differentially as regards the load current IL. Hence, the excitation of these auxiliary coils is independent of the load current and only determined by the internal circulating currents. The self-excitation of the machine is effected by separate field windings such as the series coils SF1, SF2, SF3, SF4 which are connected in the load circuit and arranged on poles P1, P2, P3, P4, respectively.

In contrast thereto and in accordance with the essential novelty of the present invention, the system shown in Fig. 3 has only four auxiliary coil units. Units CW1 and CW3 are mounted on respective poles P1 and P3, and traversed by current $Ip$, while units CW2 and CW4 are mounted on poles P2 and P4, respectively, and traversed by current $In$. These four coil units provide also self-excitation for the machine and thus replace all or part of the self-exciting windings SF1, SF2, SF3 and SF4 of the system shown in Fig. 2. This function of coils CW1, CW2, CW3, CW4 will be explained presently.

When the machine is operating under excitation of its control field windings S1 and S3, the unbalance current $In$ flowing in circuit Cn between brushes B1 and B3 (Fig. 3) passes through the armature conductors and produces an armature reaction flux $\phi n$ (Fig. 6) which is stationary and extends at a right angle to the axis of the signal-excited poles P1 and P3. That is, the axis of this reaction flux $\phi n$ coincides with that of poles P2 and P4.

As a result, the pole P2 becomes magnetically more negative, and pole P4 becomes less negative. Consequently, the armature reaction acts on poles P2 and P4 in a similar manner as the control coils S1 and S3 act on poles P1 and P3. This, in turn, causes a difference in electrical potential between the positive brushes B2 and B4, so that an unbalance current $Ip$ (Fig. 3) flows through the armature and the circuit Cp between brushes B2 and B4. The current $Ip$, in turn, induces a stationary armature reaction flow $\phi p$ (Fig. 6) in a direction perpendicular to the pole axis P2—P4. This reactive flux $\phi p$ is in opposition to the control flux $\phi s$ induced by the control windings S1 and S3 and hence weakens the original control flux.

The embodiment of Fig. 3 incorporates two ways of preventing or reducing such detrimental effect. In the first place, the detrimental reaction flux $\phi p$ is reduced by reducing its cause, i. e., by reducing the flux $\phi n$. This is done by the coils CW2 and CW4 on poles P2 and P4. The flux $\phi n'$ (Fig. 7) is in opposition to the flux $\phi n$ (Fig. 6) and varies in proportion to the current $In$ (Fig. 3) which causes the flux $\phi n$ because coils CW2 and CW4 are connected in circuit Cn between brushes B1 and B3. It will be recognized that in order to secure this function, the fields induced in the pole axis P2—P4 by coils CW2 and CW4 must be of the same direction. That is, coils CW2 and CW4 act cumulatively as regards the circulating current $In$. The above-mentioned other way of suppressing the effect of detrimental armature reaction is incorporated in coils CW1 and CW3 and the appertaining circuit connections. These coils act cumulatively to produce a flux $\phi p'$ in the axis of poles P1 and P3 and directly in opposition to the detrimental reaction flux $\phi p$ (Fig. 7) and varies in proportion to the current $Ip$ (Fig. 3) which flows between brushes B2 and B4 and causes the detrimental flux. Hence, the opposing flux $\phi p'$ is always in proper proportion to the armature reaction flux $\phi p$ to be suppressed. A compensation of this kind can be made to be 100% effective.

Instead of, or in conjunction with the above-described compensating coils CW2 and CW4, two opposition coils may be disposed on poles P2 and P4 respectively and connected in the circuit Cp between brushes B2 and B4, this connection being as shown in Fig. 3 for coils CW1 and CW3. The field of such opposition coils would oppose the flux $\phi n$ in substitution or assistance of the above-described functioning of coils CW2 and CW4. Modified arrangements of the kind just mentioned are similar or equivalent to the arrangement shown in Fig. 3 in the essential aspects of the invention explained below.

For a full understanding of my invention, it might be well to revert briefly to the diagram of Fig. 2 corresponding to disclosure of the above first-mentioned patent application. In that system, the eight coil units CC2, CD2, CC4, CD4, CC1, CD1, CC3, CD3 can be rated to perform in totality the same compensating function as the four compensating coils shown in Fig. 3 as far as the suppression of detrimental armature reaction effects is concerned. In other words, if the coil units CW1, CW2, etc., according to the present invention are given twice the number of turns of one coil unit of the Fig. 2 system, thus having an equal numer of total turns in both, the compensating effects, viewed as such are equal. In essential other respects, however, the system according to the invention is decidedly different and superior.

In an arrangement of the kind shown in Fig. 2, the load current flowing through the eight compensating coil units does not cause them to magnetize the field poles because each individual pole carries two such coil units, and these act differentially and mutually cancel their load-responsive effects. This is not the case with a system according to the present invention, because each pole carries only one of the compensating coils CW1, CW2, CW3, CW4 (Figs. 3, 7). Hence, the load current IL flowing through the four units induces current-responsive fluxes $\phi L1$, $\phi L2$, $\phi L3$, $\phi L4$ in the four respective poles (Fig. 7). It follows from Fig. 3 that, if the internal circulating current $In$ in circuit $Cn$ causes coils CW2 and CW4 to produce a compensating flux $\phi n'$ (Fig. 7) in one direction, then the fluxes $\phi L2$ and $\phi L4$ produced by the same respective coils CW2 and CW4 must have opposing directions relative to each other, because the component of the load current IL (Fig. 3) flowing through coil CW2 is in opposition to the circulating current $In$, while the load current component in coil CW4 is of the same direction as the current $In$. Similarly, since the internal circulating current $Ip$ (Fig. 3) causes coils CW1 and CW3 to produce flux $\phi p'$ in one direction, the flow of load current through these same coils must produce two fluxes $\phi L1$ and $\phi L2$ of opposing directions relative to each other (Fig. 7).

The load-current excited fluxes $\phi L1$, $\phi L2$, $\phi L3$ and $\phi L4$ are in the direction of the main exciting fluxes $\phi 1$, $\phi 2$, $\phi 3$ and $\phi 4$ (Fig. 5), respectively, produced by the above-described forcing coils, but while the latter fluxes are only controlled by the signal or input excitation of the machine, the fluxes $\phi L1$, $\phi L2$, etc., depend only on the load current and vary with the latter. Hence, the fluxes $\phi L1$, $\phi L2$, etc., caused by coils CW1, CW2, etc., are in the nature of a self-excitation. As a matter of fact, this self-excitation is equivalent to a series excitation obtainable by separate series coils such as coils SF1, SF2, SF3, SF4 in Fig. 2. In this manner, the invention leads to the partial or complete elimination of such additional self-exciting coils. Nevertheless, the self-excitation by coils CW1, CW2, CW3, CW4 does not interfere with the compensating fluxes $\phi n'$ and $\phi p'$ (Fig. 7), because the self-exciting fluxes are balanced relative to each of the pole axes P2—P4 and P1—P3. Thus the compensating coils designed according to the invention act virtually like separate sets of compensating and self-exciting coils respectively.

Self-exciting fields, as is well known, can be tuned by rating the resistance of the field circuit so that the resistance or air gap line of the machine coincides approximately with the magnetic no-load saturation characteristic of the machine along the straight-line portion of that characteristic. Such tuning may also be applied to machines according to the invention. While in particular designs this may be achieved without the provision of self-exciting coils in addition to properly rated compensating coils, it is in other cases necessary or preferable to use additional self-exciting coils which then, of course, require less copper and coil space than would be necessary in machines not built according to this invention. Thus, for instance, additional field coils PF1, PF2, PF3, PF4 are shown in Fig. 3 to be shunt connected across output terminals $Tn$ and $Tp$ in series with a rheostat R which serves to calibrate the tuning adjustment. The shunt coils are located on poles P1, P2, P3 and P4, respectively.

It will be recognized from the foregoing that the invention affords a considerable saving in copper and coil space. This is one of the reasons why the invention permits using a smaller stator structure or obtaining a higher capacity than heretofore possible with this type of machines. However, the large reduction in the number of coil units achieved by the invention is in itself another essential advantage along similar lines. The end connections of each coil unit consist usually of relatively heavy copper straps and require correspondingly large space. For instance, in a machine designed according to the invention only four coils (corresponding to coils CW1, CW2, CW3, CW4 in Fig. 3) are used instead of the twelve coil units (CC1, CC2, CC3, CC4, CD1, CD2, CD3, CD4, SF1, SF2, SF3, SF4 in Fig. 2) heretofore required for an otherwise similar design, thus saving one-half of the copper and two-thirds of the end connections previously employed. For instance, a double-stage amplifier of this design and rated for 260 kw., 3600 R. P. M. can be given the same size as a conventional (single stage) exciter of the same rating.

While I have described my invention in particular reference to, and in comparison with, double-stage four-pole generators of the type disclosed in the above first-mentioned patent application, it is obvious that the invention can likewise be applied to other multi-pole plural-stage machines, such as the eight-pole machines described in the same patent, or to the end or intermediate stages of a machine with more than two stages, for instance, as described in the above second-mentioned patent application. It will, therefore, be understood that my invention permits of many modifications and embodiments, other than those specifically described in the foregoing, without departing from the principles and gist of the invention and within the essential features of the invention set forth in the claims annexed hereto.

I claim as my invention:

1. A rotary direct-current machine, comprising a field structure having a plurality of poles of different magnetic polarities, an armature having a commutator with a corresponding plurality of brushes of respectively different electric polarities, an internal circuit connection between brushes of one polarity, an internal circuit connection between brushes of the other polarity, two field windings arranged on each of said poles and disposed in series-relation to one another in one of said connections so as to form part thereof, an input circuit having field control coils disposed on said structure for providing a controlled unbalance of flux distribution in said structure in order to cause circulating current to flow through said field windings, an output circuit connected on the one hand with a point of said latter connection between said field windings and on the other hand with said other connection to be energized in dependence upon voltage generated between said two connections, said two field windings of each pole being arranged to act cumulatively as regards said circulating current and differentially as regards output current flowing through said output circuit due to said voltage, and a plurality of auxiliary windings disposed on said plurality of poles respectively and connected in at least one of said connections so as to produce in each pole two component fluxes under excitation by internal circulating current and by output current respectively, said auxiliary winding being arranged so that said flux components due to circulating current are in the directions required to reduce the effect of armature reaction relative to the control function of said input circuit and said flux components due to output current are directed for self-excitation of the machine.

2. A rotary direct-current machine, comprising a magnetic field structure having two oppositely arranged north poles and two oppositely arranged south poles, an armature having a commutator with four brushes arranged relative to said poles to assume sequentially different electric polarities, a circuit connection between the brushes of one polarity, a circuit connection between the brushes of the other polarity, input-excited control means for varying the excitation of two oppositely arranged poles so as to cause circulating current, to flow in said connections, forcing windings disposed on said north poles and south poles respectively and disposed in one of said connections, circuit leads attached to said two connections respectively to be impressed by armature voltage controlled by said forcing windings, and four coils disposed on said four poles respectively, the coils on said north poles being series-arranged in one of said connections and the coils on said south poles being series arranged in said other connection so that said four coils, due to excitation by said circulating currents, reduce the effect of armature reaction on said input-excited control means and, due to excitation by current caused by said coils, also provide self-excitation for the machine.

3. A rotary direct-current machine, comprising a magnetic field structure having at least one pair of oppositely arranged north poles and at least one pair of oppositely arranged south poles, an armature having a commutator with a plurality of brushes of sequentially different polarities, one brush for each of said poles, a circuit connection extending between brushes of one polarity, a circuit connection extending between brushes of the other polarity, an input circut having control coil means disposed on one of said pole pairs to produce controlled internal circulating currents in said connections, forcing coils disposed on both said pairs of poles and series-arranged in one of said connections, each of said poles being provided with one auxiliary field coil, the two auxiliary field coils on said north poles being series-arranged in one of said connections, the two auxiliary field coils on said south poles being series-arranged in said other two circuit leads attached respectively to one of said connections at the midpoint between the coils arranged in said connection and to said other connection so that said circuit, when closed, is traversed by secondary current due to the voltage difference between said midpoints, said auxiliary field coils having respective polarities required to self-energize the machine due to said secondary current and to counteract, due to said circulating currents, the effect of armature reaction on said control coil means.

4. A four-pole direct-current generator, comprising a magnetic field structure with one pair of oppositely arranged north poles and one pair of oppositely arranged south poles, an armature of substantially normal four-pole chording having a commutator with four sequentially positive and negative electric polarities, two control coils arranged on the poles of only one of said pole pairs for producing a difference in potential between the brushes of one polarity in response to input voltage to be amplified, circuit means connected between said equipolar brushes and inductively associated with said four poles for providing component field excitation of substantially symmetrical flux distribution under excitation by said voltage difference, four auxiliary field coils arranged on said four poles respectively, the two of said auxiliary coils that are arranged on said one pole pair being series connected between the brushes of said other polarity, the two other auxiliary coils being series connected in said circuit means, and an output circuit connected to the midpoint of said circuit means and to the midpoint of the series-connected other auxiliary coils to provide output voltage due to said field excitation of balanced flux distribution, whereby said auxiliary coils operate to self-energize the machine and to counteract detrimental armature reaction relative to said control coils.

5. A rotary plural-stage amplifier, comprising a field structure having a plurality of pole pairs, an armature having a commutator with a plurality of corresponding pairs of brushes, a plurality of circuit connections between respective pairs of brushes to be traversed by internal circulating current, field control means for exciting a lesser number of said pole pairs to control said circulating current, forcing coils arranged on a larger number of said pole pairs for producing an amplified voltage between said circuit connections under control by circulating current, circuit leads attached to said connections to be impressed by said amplified voltage, and a plurality of auxiliary coils of which one is disposed on each pole of said larger number of pole pairs, the two auxiliary coils on one of said pole pairs being series connected in one of said circuit connections and those on another pole pair being series connected in another one of said connections so that said auxiliary coils are traversed by circulating current for reducing armature reaction on said field control means and are traversed by current from said circuit leads for producing self-excitation.

BERNARD LITMAN.